US006921001B1

(12) United States Patent
Hunt et al.

(10) Patent No.: US 6,921,001 B1
(45) Date of Patent: Jul. 26, 2005

(54) HYDRAULIC PROPORTIONING SYSTEM

(75) Inventors: William C. Hunt, Norman, OK (US); Neeraj Khanna, Norman, OK (US)

(73) Assignee: Bio-Cide International, Inc., Norman, OK (US)

( * ) Notice: Subject to any disclaimer, the term of this patent is extended or adjusted under 35 U.S.C. 154(b) by 527 days.

(21) Appl. No.: 09/801,023

(22) Filed: Mar. 7, 2001

Related U.S. Application Data

(60) Provisional application No. 60/231,098, filed on Sep. 8, 2000.

(51) Int. Cl.[7] .............................................. B67D 5/52
(52) U.S. Cl. ................... 222/139; 222/145.5; 222/159; 222/334
(58) Field of Search ................................ 222/135, 138, 222/139, 145.1, 145.5, 159, 334, 335; 137/564.5, 137/99, 895, 896, 560; 192/41 S, 81 C; 417/405

(56) References Cited

U.S. PATENT DOCUMENTS

| | | | |
|---|---|---|---|
| 3,219,071 A | * | 11/1965 | Ferster .......................... 141/94 |
| 4,250,144 A | | 2/1981 | Ratigan |
| 4,270,637 A | * | 6/1981 | Lowery ..................... 192/41 S |
| 4,651,765 A | * | 3/1987 | Beth ............................ 137/99 |
| 4,839,152 A | | 6/1989 | Vella et al. |
| 4,886,653 A | | 12/1989 | Gasper et al. |
| 5,110,580 A | | 5/1992 | Rosenblatt et al. |
| 5,290,524 A | | 3/1994 | Rosenblatt et al. |
| 5,547,584 A | | 8/1996 | Capehart |
| 5,618,440 A | | 4/1997 | Mason |
| 5,895,565 A | | 4/1999 | Steininger et al. |
| 5,989,497 A | | 11/1999 | Labonte, Jr. |
| 6,019,905 A | | 2/2000 | Waggoner |
| 6,042,802 A | | 3/2000 | Drake |
| 6,051,135 A | | 4/2000 | Lee et al. |

\* cited by examiner

Primary Examiner—Michael Mar
Assistant Examiner—Patrick Buechner
(74) Attorney, Agent, or Firm—Crowe & Dunlevy, P.C.

(57) ABSTRACT

An hydraulic proportioning system having a fluid actuated motor with a driven motor shaft, the motor being in fluid communication with and powered by a fluid source. A pump is provided having a drive shaft driven by the driven motor shaft of the fluid actuated motor, and a drive clutch interconnecting the driven motor shaft and the drive shaft of the pump. An injector manifold is in fluid communication with the pump which is connectable to a chemical source. A tube is in fluid communication with the injector manifold and extends into a chamber having fluid communication with the fluid source, the chemical and fluid from the fluid source combining in the chamber and discharged therefrom.

7 Claims, 5 Drawing Sheets

HYDRAULIC PROPORTIONING SYSTEM

RELATED APPLICATIONS

This application claims priority to Provisional Application No. 60/231,098 entitled "Hydraulic high ratio proportioning system" filed Sep. 8, 2000.

FIELD OF INVENTION

The present invention relates generally to the field of mixing and proportioning devices and more particularly, but not by way of limitation, to the generation and delivery of chemicals such as chlorine dioxide in low concentration using hydraulic power.

BACKGROUND OF INVENTION

Various industrial processes often require mixing of liquids that involve ratios as low as one part in five thousand (1:5000). Even lower mixing ratios, below 1:10,000, can be involved in specialized cases. Currently, such mixing is attained using sophisticated diaphragm pumps and electronic logic. Such pumps are difficult to operate and are quite expensive. For example, a commonly used, low volume, high pressure gas chromatography pump costs approximately $5000 per unit.

Moreover, current systems require electrical power for operation. The existing systems utilize high cost electronic control logic for the electric metering pumps, mixing chambers and fail safe systems. The electronic logic, pumps and fail safe parts can cost from about $4000 up to about $12,000. These costs can double if an electronic pump must be made explosion proof.

There are some non-electric pumps available for attaining low ratio proportioning. Such pumps generally deliver ratios as low as one part in four thousand (1:4000). This 1:4,000 ratio is achieved in conventional pumps at the lower end of their adjustment window and has proven unreliable in the field.

The metering process becomes even more complicated when the mixing of two concentrates is required before the mixture is proportioned with a third liquid at a low ratio. One such system available to mix two chemicals utilizes two water-actuated pumps in series, but the system is subject to a host of problems due to the water hammer effect which occurs with the arrangement. Furthermore, additional water motors must be utilized to make the system function, thereby adding to the cost and complexity.

There is no available, non-electric system that will automatically perform this process, especially if the water flowrate is as low as one fluid ounce per minute. Accordingly, it would be desirable to have available a fluid powered proportioning system that can accurately achieve low ratio proportioning.

SUMMARY OF INVENTION

The present invention provides a hydraulic proportioning system containing a water actuated motor having a driven motor-shaft, at least one pump having a drive shaft, a drive clutch connected to the driven motor-shaft and to the drive shaft and an injector manifold that supports a reaction tube. The injector manifold is in fluid communication with a water source, having an inlet in fluid communication with the pump, another inlet in fluid communication with the water source, and an outlet for dispensing the solution. The driven motor-shaft, in conjunction with the clutch, converts linear motion generated by the water-actuated motor to rotary motion utilized by the pumps to move chemicals to the reaction tube. The use of an exclusively water-actuated system eliminates the expense involved in incorporating explosion proof electric components where such systems are necessary, such as for use on airports ramps.

The objects, advantages and features of the present invention will be apparent from the following description when read in conjunction with the accompanying drawings and appended claims.

BRIEF DESCRIPTION OF DRAWINGS

FIG. 6 is a partially cutaway, elevational view of another embodiment of FIG. 1. that is especially suited for injection of two discreet chemicals.

DESCRIPTION OF THE PREFERRED EMBODIMENT

Figure 1:
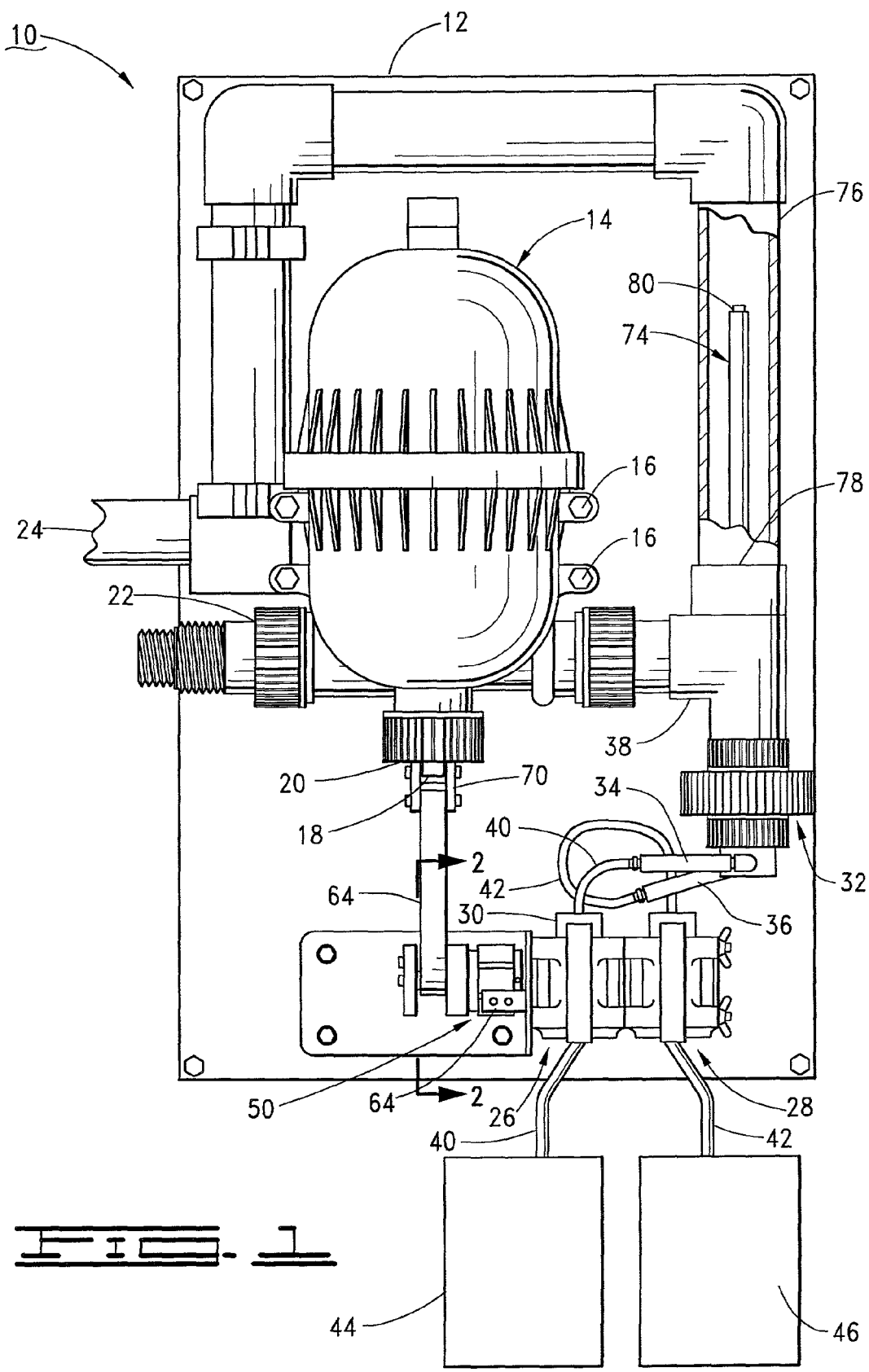
FIG. 1 is a partially cutaway, elevational view of a hydraulic proportioning system constructed in accordance with the present invention.

Referring to the drawings in general, and more particularly to FIG. 1, shown therein is a hydraulic ratio proportioning system 10 constructed in accordance with the present invention. The proportioning system 10 is shown in a housing 12, the cover of which has been removed to disclose the components contained therein. Numerous other details of the proportioning system, such as certain valving and other support components are not shown or described as such will be apparent to those skilled in the art.

Supported in the housing 12 is a water motor 14 secured to the housing 12 via one or more brackets and bolts 16. The water motor 14 is a conventional device that is powered by pressurized fluid, usually water or a water mixture containing propylene or ethylene glycol, and converts the pressure drop caused by the passing fluid into reciprocating motion by way of an internal, reciprocating piston mechanism connected to a driven shaft 18 that projects from a shaft port 20. The water motor 14 has a fluid inlet 22 and a fluid outlet 24, each of which has a threaded connector. The water motor 14 can be any one of several altered commercially available units, one of which being DosMatic Advantage Model No. A-20 water actuated metering pump with the lower chemical pump removed, available from the DosMatic Corporation of Carrollton, Tex. One skilled in the art will understand that various additional items, such as a filter, pressure regulator, etc. may be necessary to assure water quality and pressure.

A pair of axially aligned first and second pumps 26 and 28 are supported on the housing 12 via brackets. The pumps 26 and 28 are preferably peristaltic pumps available as Model L/S07013-21 and L/S07014-21 respectively, marketed by the Barnant Company of Barrington, Ill. The pumps 26 and 28 will be discussed further below, but it will be noted that the construction of a peristaltic pump is such that a pliable conduit (usually a plastic tubing) is disposed to pass through the body of the pump. Internal to the pump body is a rotor having spatially disposed lobes that are supported to bear against, and compress, the conduit as the rotor is powered. The compression points of the lobe contacts move along the conduit to advance fluid in the conduit. Peristaltic pumps are especially suitable for applications in which low and accurate flow rates are required, and in applications where it is desired to pump a fluid with no actual contact with the pump.

An injector manifold 32 is supported above the pair of pumps via a connector such as a union and tubing or a bracket (not shown). The injector manifold 32 is a substantially tubular member having a pair of input connectors 34 and 36 at the lower end thereof, and a side extending conduit stub 38. First pump tubing 40 extends through first pump 26 and a second pump tubing 42 extends through the second pump 28. There are several tubing materials that can be used, such as the high pressure tubing marketed by Kemsure of Philadelphia, Pa. This tubing fits most production peristaltic pumps and will withstand pumping pressures of over 80 psi (approximately 6 bar) and most chemical compounds that will be used. Another suitable type is a thermoplastic, polypropylene-based elastomer material with mineral oil such as Masterflex® Pharmed® tubing. Viton® tubing 42 can also be used and can have a longer life because of its chemical resistive nature but the Viton® tubing 42 cannot be subjected to extensive wear. Optionally, tubing 42 can extend into the injector manifold 32, as shown in FIG. 1. The apparatus of the present invention also includes seals and connectors (not shown) to connect the various components as one skilled in the art would understand.

One end of the first pump tubing 40 connects to the input connector 34 of the injector manifold 32, and one end of the second pump tubing 42 connects to the input connector 36. The lower portions of the first and second pump tubing 40, 42 extend through appropriately disposed openings in the housing 12. At the point of use in the proportioning system 10, the portions of the first and second pump tubing 40 and 42 that extend from the housing 12 are positioned into injecting fluid supply containers 44 and 46 containing chemicals, otherwise referred to as precursors, as shown in FIG. 1, more of which will be provided below.

Figure 2:
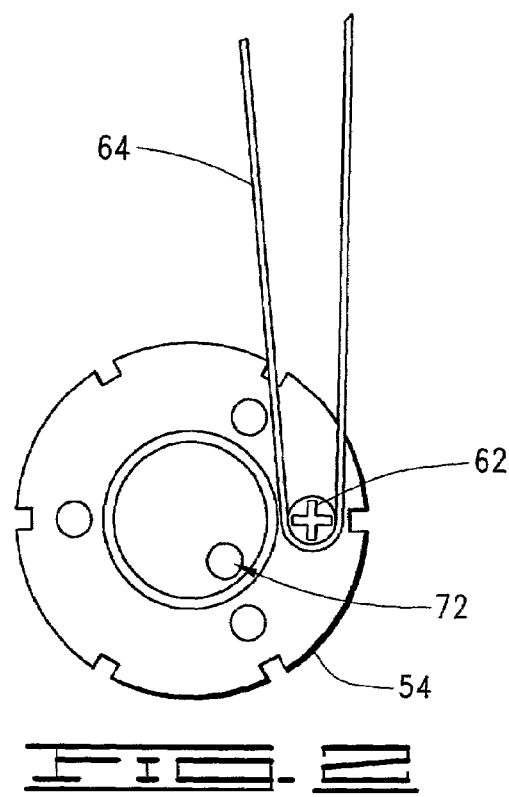
FIG. 2 is an end view of a connecting mechanism of the pump motor of the hydraulic proportioning system of FIG. 1 taken along the line 2—2.
Figure 3:
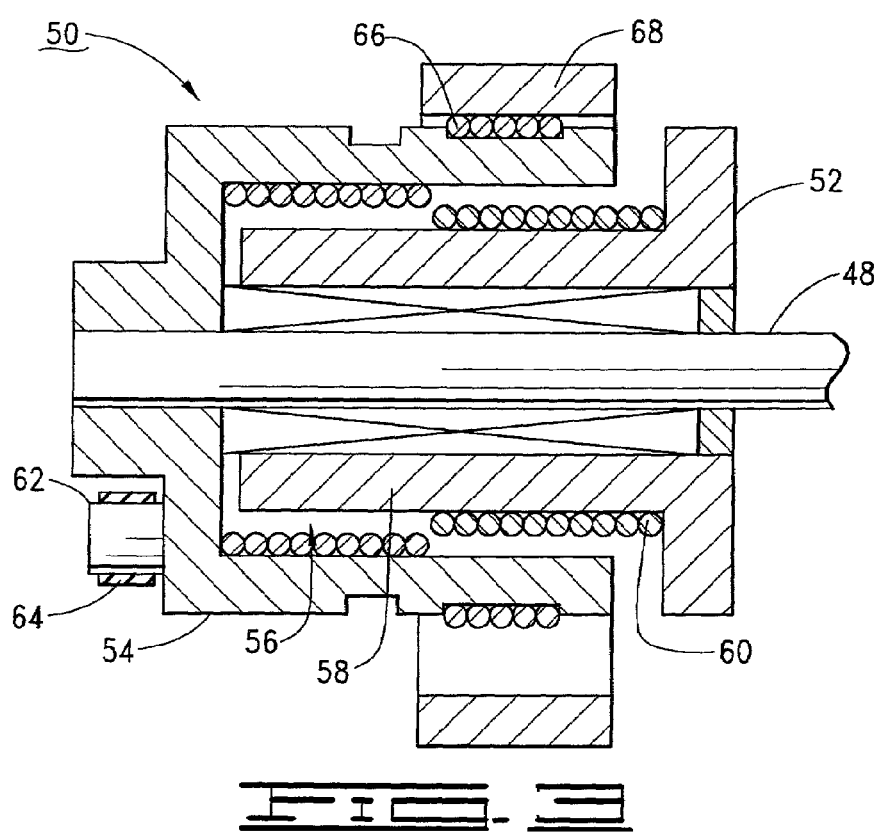
FIG. 3 is a partial cross-sectional view of the clutch of FIG. 1.

A common drive shaft 48 (shown in FIG. 2) extends through, and rotates the rotors of pumps 26 and 28. Connected to the drive shaft 48 is a rerun rewinding drive clutch 50. An end view and a cutaway view of the drive clutch 50 are shown in FIGS. 2 and 3, respectively. The drive clutch 50 has an output mandrel 52 that is pressed and keyed onto the drive shaft 48; an input drum 54 having a bore 56 dimensioned to receive a cylindrical portion 58 of the output mandrel 52; an activation spring 60 disposed over the cylindrical portion 58 within the bore 56; and one or more extensions, one known as a pulley 62, dimensioned to contact a pulley belt 64. The pulley 62 can also be a bolt or other connector.

Included in clutch 50, as shown in FIG. 3, is a return-spring 66 attached to the input drum 54 inside a return-spring housing 68. The clutch 50 is made to rewind after the power stroke through the use of the return-spring 66. The adjustment of the return-spring 66 enables the dilution rations to be altered in the field. The clutch 50 has numerous other details, such as bearings, seals and other support components not shown or described as such will be apparent to those skilled in the art. A suitable clutch 50, which should be able to withstand millions of cycles before servicing, is available as a custom manufactured item, with the return-spring 66 added, from Machine Components Corporation of Plainview, N.Y.

Figure 4:
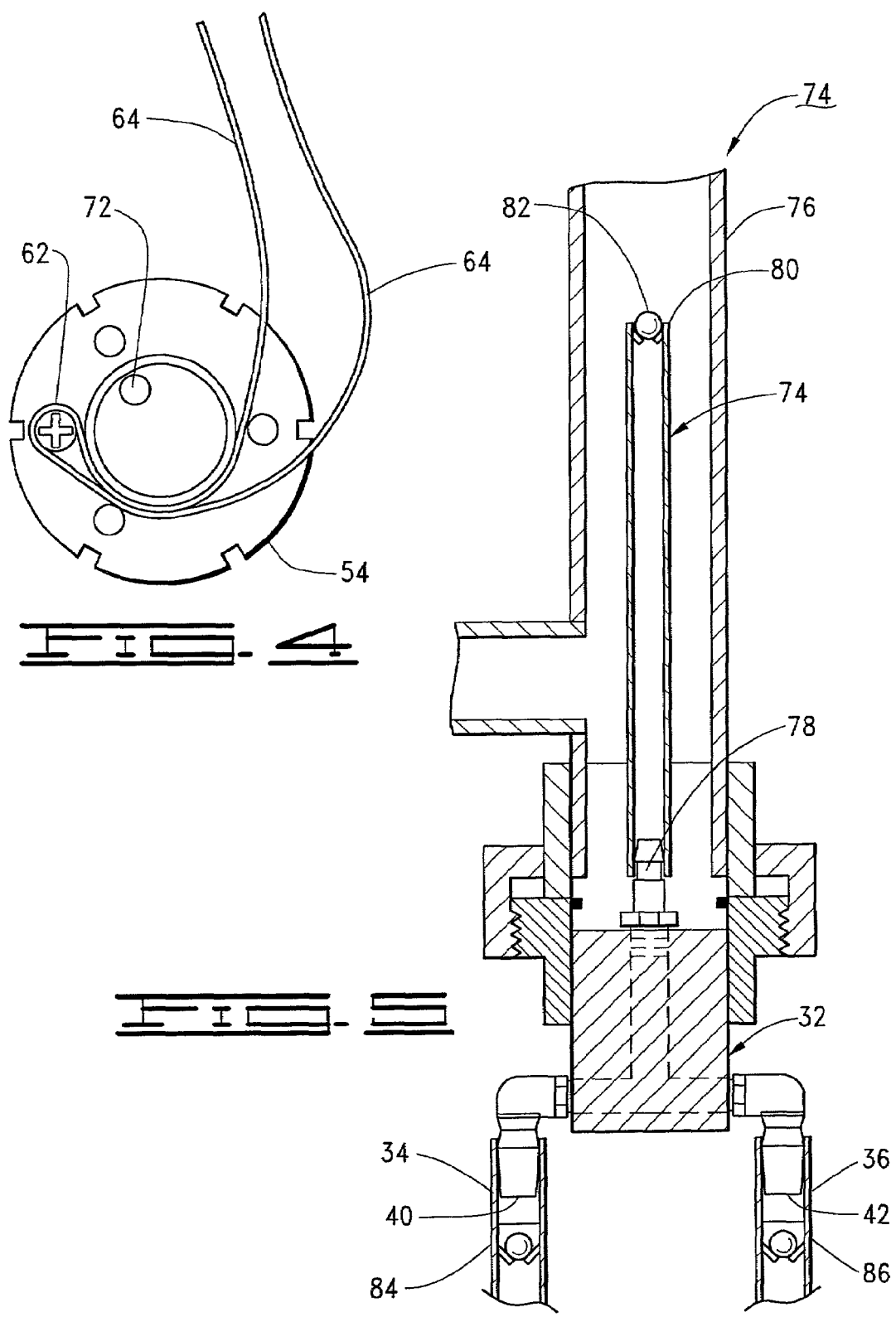
FIG. 4 is an end view of a connecting mechanism of FIG. 2 with a slackened belt.

The pulley belt 64 is attached to the driven shaft 18 with a clevis 70. The clevis 70, which can be a roller chain link, and the pulley belt 64, coupled with clutch 50, convert the reciprocatory vertical output motion of the driven shaft 18 to rotational torque on the drive shaft 48 of the peristaltic pumps. The clevis 70, the pulley belt 64, and the clutch 50 (stop position) can be adjusted to change the concentration of chemicals pumped and thus the content of the final solution produced by the hydraulic proportioning system 10. This is achieved by releasing some of the tension on the clutch 50 so that the belt 64 becomes slack in various amounts, as shown in FIG. 4, at the end of each rewind cycle. This slackening of the belt 64 can reduce the amount of product pumped down to 2 ppm in a 5 ppm configuration. More accurate adjustments can be made by installing an adjustable stop pin 72 (shown in FIG. 2) on the outside of pulley extension to allow only a percentage of the rewind to occur. The pulley belt 64 will slacken but will resume tension on the up-stroke and power the pumps 26, 28 at a desired preset percentage of the maximum revolution. Other means of adjusting the ratios will be discussed below.

Figure 5:
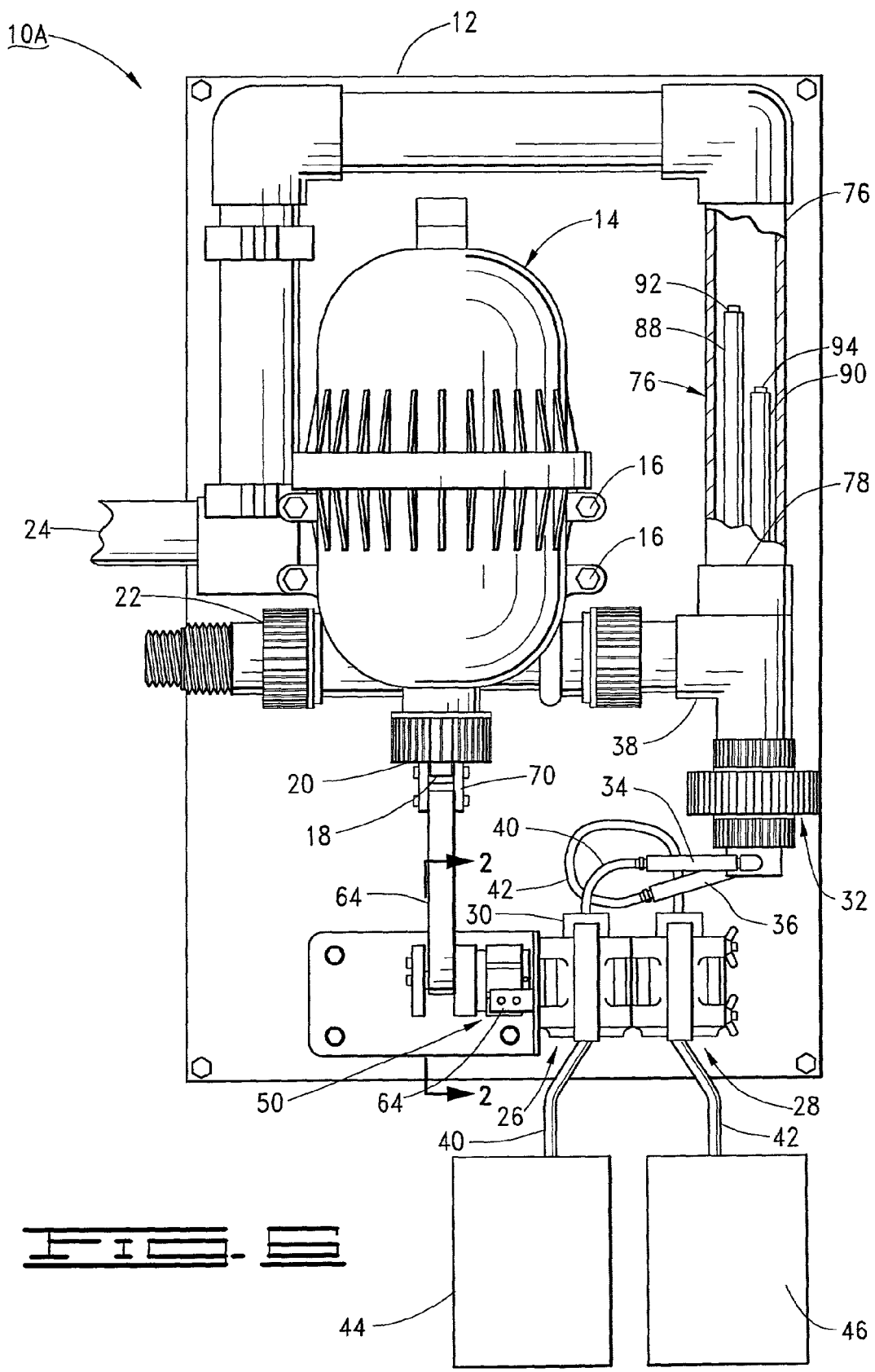
FIG. 5 is a partial cross-sectional view of the generation tube of FIG. 1.

The reaction tube 74 is supported by the injector manifold 32, shown in FIG. 5. The reaction tube 74 can be supported in an optional chamber 76 for safety and space considerations, such that water flow around the reaction tube 74. The reaction tube 74 can stand alone or can be incorporated into the injector manifold 32, as would be clear to one skilled in the art. The reaction tube 74 has a tube inlet 78 which is in fluid communication with the injector manifold 32 and a tube outlet 80. The tube outlet 80 can support and be in fluid communication with an optional reaction tube check valve 82. After reacting, the chemical-mixture, which can actually be a reacted product or simply a mixture, can be pushed through the check valve 82 by incoming fresh chemicals. The reaction tube 74 can be placed in an upright position with the tube outlet 80 facing up-ward so that the gas produced accumulates and is expelled at the outlet end of the reaction tube 74. This minimizes the possibility of diffusion of the produced gas into the injecting fluid containers 44, 46 via the inlet tubing 40, 42. The expelled lighter gas prevents the premature displacement of reacting precursors by the produced gas.

The check-valve 82 facilitates the special needs of a peristaltic system. The combination of peristaltic pump 26 and water-actuated motor 14 is quite sensitive to back pressure. A water hammer effect can be produced when the piston of the water-actuated motor 14 reverses direction. This water hammer effect can be such that it forces reverse flow of water back into the reaction tube 74 and can force the chemical back into the tubing 40, 42. Excessive water hammer effect can cause fluid slippage in the peristaltic pumps. The installation of the one way check valve 82 at the end of the reaction tube 74 minimizes this slippage. A suitable check-valve for this purpose having superior chemical resistance is available from the Smart Products Company of San Jose, Calif., as model numbers 110 KYA-1 #-T and 120 KYA-1 #-T.

Additional check valves 84, 86 can be installed in the first pump tubing 40 and the second pump tubing 42 between the pumps 26, 28 respectively and the injector manifold 32, such as in the tubing connectors. These check valves 84, 86 help prevent gas generated in the reaction tube 74 from diffusing back into the tubing 40, 42 during system down-time. Without the check valves 84, 86, the mixed-precursor gas can leak or diffuse back and damage the pumps 26, 28 or tubing 40, 42. The check valves 82, 84, 86 are most important when high water pressures are used. When the water motor 14 is operating under higher pressure conditions, the water hammer effect is more of a problem. Alternative solutions to the water hammer effect problem include installation of other devices known in the art, such as a snubbing device or a bladder expansion chamber, or by increasing the spring tension in the peristaltic head rollers or wall thickness of the peristaltic tubing. Combinations of the above mentioned remedies may be used to eliminate the back-flow problem and the water hammer effect problems that develop during operation of the present invention.

While the present invention can operate over a wide range of water pressures, it has been found that water pressure between 5 to 100 psig is preferable. The present invention works efficiently with input water pressures over 35 psig and can be modified to work well below 25 psig, a requirement in the airline industry.

The present invention allows low volume output and dilution of pre-mixed or reacted chemicals into a variable water flow to accommodate the high dilutions needed without the use of expensive electronics or flow monitors. The peristaltic pumps of the present invention yields an accuracy at low volumes that is not possible from the present, water-actuated syringe and diaphragm pumps. They provide ease of adjusting proportioning ratios by changing the tubing in the pumps, by changing the gears, adjusting pulley stops, adjusting pulley diameter, or by slackening the belt 62, as shown in FIG. 4.

In the present invention, the peristaltic pumps can be stacked so that two or more different chemicals will run in the same ratio off the same shaft 48. If desired, the chemicals can be mixed at different ratios by changing the tubing sizes of each peristaltic pump 26, 28. Running two or more pumps connected to the same water motor keeps all ratios (water, and the two or more precursor chemicals) synchronized. This assures that the relative ratios will not change as water flow and pressure changes.

The configuration of the present invention shown in FIG. 1 has an activator pump 26 that is capable of pumping activator through the pump 26 from an acid source 44 to the injection manifold 32 and a Purogene® pump 28, such as a sodium chlorite solution pump, that is capable of pumping sodium chlorite solution from a sodium chlorite solution source 46. Two chemicals are piped into the reaction tube 74. The reaction tube 74 is used because the concentration of the precursor chemicals (sodium chlorite solution and acid in the present invention) must be maintained for specific time for proper reaction. The reaction tube 74 can take many forms, as one skilled in the art will know. The reaction tube 74 also controls the reaction time for the chemicals that must travel a certain distance and reside a certain time in the reaction tube 74 before being expelled from the reaction tube 74. The reaction time can be controlled by varying the size, volume and length of the reaction tube 74.

One use of the current invention is to produce Chlorine dioxide by mixing sodium chlorite solution with a protic acid. The concentration of sodium chlorite solutions used can range from 0.05% to 25%. Any protic acid in the concentration range of 1 to 90% can be used in combination with a "chlorite", including sodium chlorite and potassium chlorite. Any suitable protic acid may be used such as, without limitation, phosphoric, hydrochloric, sulphuric, nitric, acetic, citric, tartaric, glycolic, mandelic, salicylic, malic, maleic, aspartic, lactic, or other structurally similar acids. Persons skilled in the art will recognize other suitable protic acids, all of which are intended to be suitable for use in the present invention. For example, sodium chlorite solution concentrations between 1 to 8.3% and a phosphoric acid concentration of 10% to 75% can be used. Other ranges that would be useful are sodium chlorite solution concentrations of 1 to 10%, phosphoric acid concentrations of 5 to 75%, hydrochloric acid concentrations of 5 to 37%, and citric acid concentrations of 5 to 50%. These solutions can be used in various combinations as suitable for different applications. This invention can mix and proportion to a ratio of 10,000:1. With modifications of the pulley size on the clutch, it is possible to achieve a ratio of 500,000:1. The system can be altered by changing the tubing and pump heads to pump different dilutions. A change in pump head size to a very small pump head could bring the dilution capabilities down to 1,000,000:1 and even lower.

The present invention shown in FIG. 1 can be built with a modified DosMatic Advantage Model # A-20 attached to the clutch where the clutch-input drum pulley 62 has a diameter of 0.78" but is adjustable from 0.5" to 8", the larger the diameter of the pulley 62, the lower the concentration. The pulley 62 with a 0.78" diameter is suitable because it allows the best usage of existing tube sizes to produce the targeted ppm ranges from the designated precursor most in demand in a dilute solution. These include ranges from 5–50 ppm in the final dilute solution.

The pulley's circumference is 2.45" while the water motor stroke is between 2.7" and 2.8". If the water motor cycles six times per gallon of water moved, the pumps produce 0.98 cc of 3.35% precursor for each gallon of motive water flowing through the system. This produces 5 ppm in the final dilute solution.

As discussed above, the system can be tweaked by slackening the pulley belt 64 so the belt becomes slightly slack at the end of the rewind cycle. This reduces the amount of product pumped so that the final solution can be a 2 ppm solution. The adjustable stop pin 72 can make this adjustment more accurate and repeatable. This adjustment can be made to increase/decrease the dilution ratios. For example the clutch 50 is pulled upward in the upward power stroke of the water motor. The clutch rewinds 360 degrees to return to the start position. If the clutch rewind is stopped at 180 degrees of the available 360 degrees, the pulley belt 64 that is designed for 360 degrees of rewind will slacken (see FIG. 5). When the power stroke is applied to the 180 degrees of pulley belt 64 on the overrunning clutch, only half of the power stroke will produce rotary motion to the pump thus the amount of peristaltic pump action will be reduced to half of its maximum potential output. Other ways to adjust the ratios include changing the pump/tubing sizes and altering the pulley diameter. The larger the pulley the lower the number degree rotation per cycle of drive shaft 18. For example if the pump stroke is 2.2", then a 0.7" diameter pulley could turn the pumps 360° or one revolution. This will yield a ratio between the motive fluid and the pump heads can be altered by changing tubing sizes in the pumps. By changing the size of the pulley to 2" each stroke would rotate the pump heads 125°. Finally the ratio output of the system can be altered by changing tubing sizes in the pumps, as discussed above, installation of adjustable pulley stops, and/or changes in pulley diameter, and by tension adjustments to the pulley belt. By adjusting all of the adjustments discussed above, a wide range of ratios between precursors is achievable.

A suitable first pump, to allow this embodiment to produce a 5 ppm final dilute solution, is a Barnant model # L/S 07013-21 using L/S 13 first pump tubing 40 that has an internal diameter of 1/32". This arrangement will deliver about 0.06 milliliter of 33% phosphoric acid per revolution in the present embodiment. A suitable second Purogene® pump is a Barnant model # L/S 07014-21 using L/S 14 second Purogene® pump tubing 42 that has an internal diameter of 1/16". This arrangement will deliver about 0.21 milliliter of 3.35 sodium chlorite solution per revolution in the present embodiment.

One of the key features of this system is that all reactions and concentrations remain in the correct preset proportions even as the water flow volume varies through the system. The ratio can be maintained from the system even when the water flow was reduced to around 25 fluid ounces per minute or 20 gallons per minute. Another smaller system can be made by using a smaller water motor, such as a Lebermatic water motor, to get down to 0.3 fluid ounces per minute. This embodiment would be ideal for treating grocery store produce case sprays with chlorine dioxide. The system does not need any adjustments if the number of open nozzles in the water line fluctuates, which is common in the produce spraying systems of a grocery store.

This embodiment can also be used to produce a 50 ppm final dilute solution by changing the size of the pumps and tubing. For example if the first pump is a Barnant model # L/S 07016-21 using L/S 16 first pump tubing 40 that has an internal diameter of 1/8", the first pump will deliver about 0.8 milliliter of 33% phosphoric acid per revolution. If the second Purogene® pump is a Barnant model # L/S 07024-21 using L/S 24 second Purogene® pump tubing 42 that has an internal diameter of 1/4", the second pump will deliver about 2.8 milliliter of 3.35 sodium chlorite solution per revolution. This embodiment will then produce a 50 ppm activated sodium chlorite solution from a 3.35 sodium chlorite precursor. This embodiment can be used with sodium chlorite precursors with concentrations from 7.5 to 8.3% to produce a resultant solution of 100 to 110 ppm for food plant sanitation and other uses that one skilled in the art would recognize as a use for a dilute sanitation solution.

This embodiment can also be used with any dye, fragrance, water conditioner or blend thereof suitable for the customer's needs. For instance a 3.1% blue dye can be used as the precursor. The dye solution can be prepared by diluting the commercially available 50% Hidacid Azure blue dye (B.F. Goodrich Performance Materials of Cincinnati Ohio) and the concentration of sodium chlorite solution would be between 3.35 and 8.3%. The final concentration of the dye and sodium chlorite solution in the use-solution would be 50 ppm and 115 ppm, respectively. This embodiment was used to deliver a mixture of sodium chlorite solution and dye.

FIG. 6 shows another embodiment of the current invention to be used with any dye, fragrance, water conditioner or blend thereof suitable for the customer's needs. In this specific embodiment 3.1% blue dye was again used as the precursor. As discussed above, the dye solution was prepared by diluting the commercially available 50% Hidacid Azure blue dye and the concentration of sodium chlorite solution is 3.35%. This embodiment has a first tube 88 and a second tube 90 connected through the injector manifold 32 in the manner described above but not mixed in the injector manifold 32. The first tube 88 can have a first check valve 92 and the second tube 90 can have a second check valve 94.

A suitable first pump is a Barnant model # L/S 07024-21 using L/S 24 first pump tubing 40 that has an internal diameter of 1/4". This arrangement will deliver about 2.8 milliliter of 3.35% sodium chlorite solution per revolution in the present embodiment. A suitable second Purogene® pump is a Barnant model # L/S 07024-21 using L/S 24 second Purogene® pump tubing 42 that has an internal diameter of 1/4". This arrangement will deliver about 2.8 milliliter of dye, fragrance, or water conditioner per revolution in the present embodiment to meet the proper level for a specific type of toilet water treatment. The tubing size and dye concentrations can be altered to meet various needs, as is well known by those skilled in the art. The dye solution in this embodiment is not combined with the Purogene® in the injector manifold 32 or in one tube in order to preserve the stability of the dye. The two products are injected individually into the water flow each from separate tubing 88, 90. One skilled in the art would understand that there are other situations when the two chemicals should be kept separate until dispensed and diluted into the water stream.

This embodiment can be used as a portable or a stationary mixing station for toilet treatment solutions. One manifestation would be to use the this embodiment on a truck for treating portable contract toilets in the field. With this embodiment only water is needed in the truck, solutions can be made on an as needed basis, saving on the cost of the dye or dye/fragrance package. The use of sodium chlorite solution as the main odor neutralizer is very favorable to the industry because it has a very low toxicity level, it is economical and it eliminates odor versus masking the odor with fragrance.

This embodiment can produce substantial savings for any type of toilet treatment. And can save the appearance of the plastic surfaces of the toilet itself. This invention allows for easy use of oxidant chemistry when dye is involved in the solution, not possible with current technology. Another manifestation of this embodiment would involve a bypass for the dye concentrated so the dye can be injected only as needed for the treatment of the toilet tank solution. The wash water for the toilet can be treated with sodium chlorite only by choosing to bypass or not to bypass the dye precursor.

Figure 7:
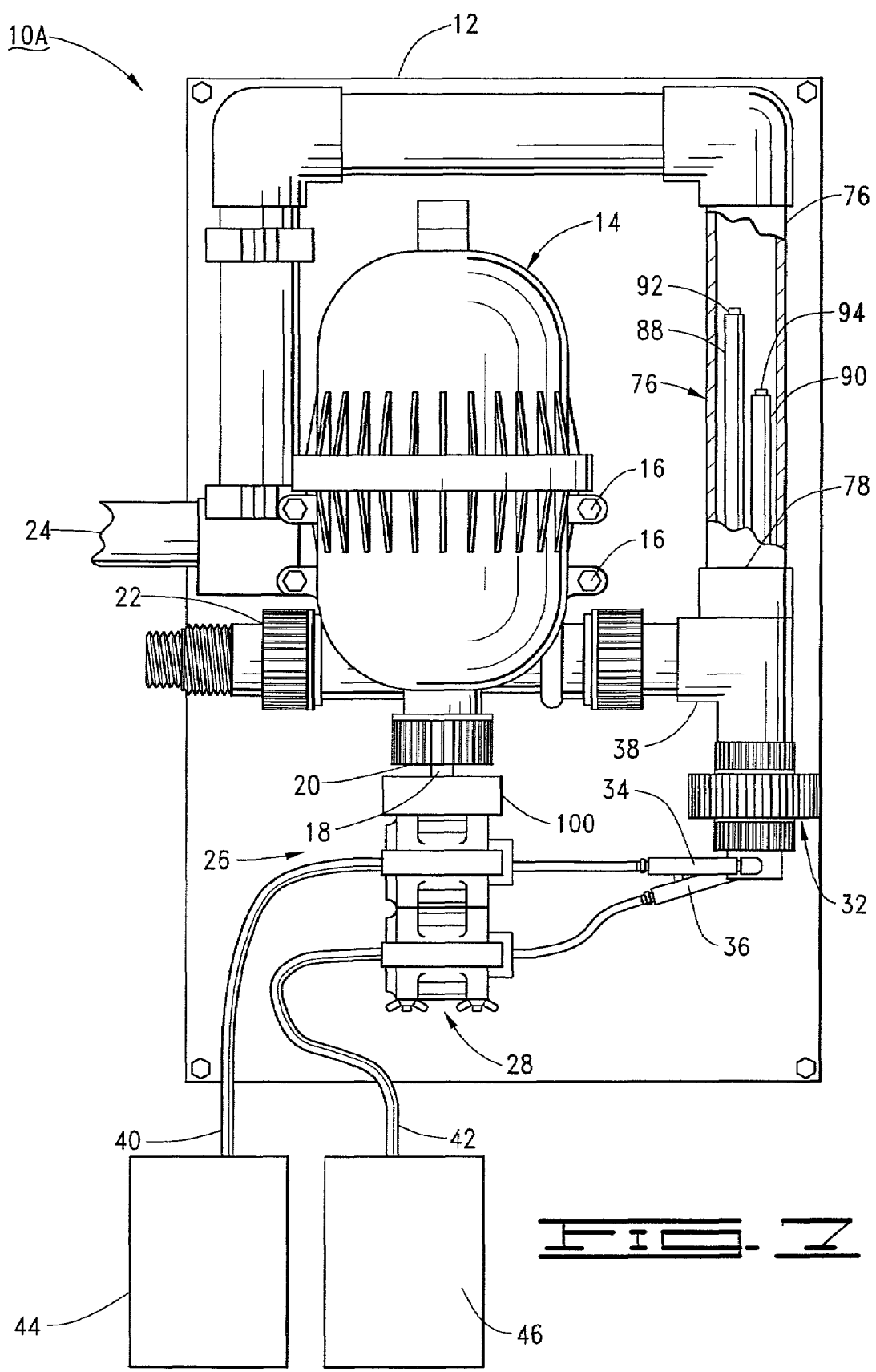
FIG. 7 is a partial cutaway, elevational view of another embodiment of FIG. 1.

FIG. 7 shows another embodiment of the current invention that includes a connection means 100 below the water motor 14. This connection means 100, also known as an interfacing device, is an alternative to clutch 50 in all the described embodiments discussed above. The interfacing device 100 of FIG. 7 can include a number of mechanical interfacing devices that convert linear motion to a motion capable of operating a pump (usually rotational motion). These interfacing devices, which can be used interchangeably, include a ratchet and pawl, a rack and pinion connected with a unidirectional clutch as well as a a rack and pinion combined with the ratchet and pawl mentioned above, a rack and pinion connection in a gear box that translates reciprocating motion into a unidirectional rotation, a dual unidirectional clutch, a lever and arm crank action to convert reciprocating motion into rotation motion, and a chain and gear device; or combination of the above.

The first interfacing device is a rachet and pawl, this interfacing device eliminates the unidirectional clutch. The second interchangeable interfacing device is a rack and pinion connected with a unidirectional clutch. The use of a rigid linear gear with a rotating round gear requires the unidirectional clutch along with a flexible belt around the mandrel to prevent the backward rotation of the pumps on the return stroke of the motor. The third interchangeable interfacing device is a rack and pinion connection that translates the reciprocating motion of the shaft into a unidirectional rotation.

The fourth interchangeable interfacing device is a dual unidirectional clutch that would utilize the full duodirectional power strokes of the water motor and would attach the two peristaltic pump heads each to their own unidirectional clutch. The up stroke of the water motor would power one pump and the down stroke would power the other pump. The cost of the extra clutch makes this a more expensive alternative. The fifth interchangeable interfacing device is a lever and arm crank action to convert reciprocating motion into rotation motion. This is the same device that is used in a steam train to convert the reciprocating motion of the steam piston into rotation of the wheels of the train. Since the direction of the pump is important, the crank must be started at the correct angle so that the peristaltic pump pumps in the correct direction.

The sixth interchangeable interfacing device is a chain and gear device which is simply a bicycle chain with a rear bicycle unidirectional rear hub.

Chlorine dioxide is a commonly used sanitizer, the generation of which requires the mixing of two chemical concentrates that are initially provided sufficient time to react, following which the reacted mixture is injected into the water stream to achieve the desired concentration. Generally, chlorine dioxide is produced by mixing one to ten percent (1% to 10%) solutions of sodium chlorite with a protic acid. The concentration of available chlorine dioxide required in some applications, such as in cooling tower treatments, is as low as one half part per million (0.5 ppm). To achieve this concentration from a 10% sodium chlorite solution would require a proportioning ratio as low as one in two hundred thousand (1:200,000), chlorite to concentrate.

The present invention can generate and meter sanitizers in low concentrations and can be operated by a pressurized water source under the conditions of variable water flow from that pressurized water source. This invention can also be used to blend and dilute drummed chemicals that need to be mixed just prior to use because they may react, bleach, separate or spoil if stored too long as concentrates in a mixed or reacted condition. The above discussed toilet treatment is a good example because the dye and oxidants cannot be stored as a concentrate because the dye would bleach out.

A version, possibly a smaller version of the present invention discussed above, is useful for many purposes including for sanitation purposes to treat i) vegetables in the cabinets of grocery stores (from a water source with a water flow range of 0.3 oz per min to 1.5 g.p.m.); ii) fresh picked produce (from a water source with a flow range of 1 to 40 g.p.m.); iii) potatoes going into storage (from a water source with a flow range of 3 to 9 g.p.m.); iv) potatoes in storage (from a water source with a flow range of 22 fl. oz. to 9 g.p.m. sanitizer); v) hard surfaces for food or other uses (from a water source with a flow up to 25 g.p.m.); iv) airline drinking water (from a water source with a flow rate that varies from plane to plane); v) animal drinking water (from a water source with a flow rate that varies); vi) potable water treatment for human consumption in hospital wells (from a water source with a flow rate that varies) and elsewhere; vii) cooling tower water (from a water source with a flow rate that varies); viii) golf course maintenance water (from a water source with a flow rate that can vary); ix) control of bacteria, such as Legionella, in variable flow hot water systems; and x) other similar situations. Such a unit is also needed to meter products going into ice machine water-lines for producing chlorine-dioxide-impregnated ice.

The present invention works efficiently with input water pressures over 85 psig and can be modified to work well below 25 psig, a requirement in the airline industry, where a very useful application of this embodiment is for sanitation purposes where there is a need for explosion proof systems. The use of exclusively water-actuated systems eliminates the expense of incorporating explosion proof electric components. This invention can also be used for in-line mixing of chlorite solutions with a dye/fragrance product for use in airline toilets and commercial portable toilets.

It is clear that the present invention is well adapted to carry out the objects and to attain the ends and advantages mentioned as well as those inherent therein. While presently preferred embodiments of the invention have been described in varying detail for purposes of the disclosure, it will be understood that numerous changes may be made which will readily suggest themselves to those skilled in the art and which are encompassed within the spirit of the invention disclosed and as defined in the above text and in the accompanying drawings.

We claim:

1. A hydraulic proportioning system comprising:
   a fluid actuated motor having a driven motor shaft, the motor being in fluid communication with a fluid source;
   a first pump having a drive shaft, an inlet and an outlet, the inlet of the first pump connectable to a first chemical;
   a drive clutch connected to the driven motor shaft and the drive shaft;
   an injector manifold in fluid communication with the fluid source and having an inlet in fluid communication with the outlet of the first pump, wherein the injector manifold has an outlet;
   a reaction tube in fluid communication with the injection manifold outlet, the reaction tube comprising:
      an inlet;
      an outlet; and
      a check valve connected to the outlet;
   a chamber, wherein the reaction tube is disposed to extend into the chamber and wherein the chamber comprises:
      a chamber inlet in fluid communication with the fluid source; and
      a chamber outlet;
   a check valve the check valve being in fluid communication with the outlet of the first pump and the inlet of the injector manifold; and
   a second pump, connected to the drive shaft of the first pump and powered thereby, and a second chemical wherein the second chemical mixes with the first chemical in the reaction tube and then mixes with fluid from the fluid source in the chamber and are discharged from the chamber outlet, the second pump comprising:
      an second pump inlet;
      a second pump outlet; and
      a second pump check valve in fluid communication with the second pump outlet and the injector manifold inlet.

2. A hydraulic proportioning system comprising:
   a fluid actuated motor having a driven motor shaft, the motor being in fluid communication with a fluid source;
   a first pump having a drive shaft, an inlet and an outlet, the inlet of the first pump connectable to a first chemical;
   a drive clutch connected to the driven motor shaft and the drive shaft;
   an injector manifold in fluid communication with the fluid source and having an inlet in fluid communication with the outlet of the first pump, wherein the injector manifold has an outlet;
   a second pump connected to the drive shaft of the first pump and powered thereby, the second pump having an inlet and an outlet, the inlet of the second pump connectable to a second chemical;

a first tube connected to the injector manifold and receiving the first chemical from the first pump, the first tube having an outlet in fluid communication with the reaction tube; and a second tube connected to the injector manifold and receiving the second chemical from the second pump, the second tube having an outlet in fluid communication with the reaction tube.

3. The system of claim 2 further comprising a chamber, and wherein the first and second tubing are disposed to extend into the chamber, the chamber having a chamber inlet in fluid communication with the fluid source so that the first chemical and the second chemical from the first and second tubing mix with fluid from the fluid source in the chamber and is discharged from the chamber outlet.

4. The system of claim 3 further comprising a pair of check valves in fluid communication with the outlets of the first and second pumps and with the inlet of the injector manifold.

5. The system of claim 4 wherein the chamber has a transparent portion.

6. The system of claim 2 wherein the driven motor shaft is reciprocatingly driven by the fluid actuated motor, and wherein the drive clutch further comprises:

an input drum rotated by the driven motor shaft;

an output mandrel connected to the drive shaft;

spring means for connecting the input drum and the output mandrel, imparting rotation to the drive shaft, and returning the input drum with the driven motor shaft.

7. A hydraulic proportioning system for proportioning first and second chemicals sources for mixture with a fluid, the system comprising:

a fluid actuated motor;

first and second pumps driven by the fluid actuated motor, each pump having an inlet connected to a separate chemical source, wherein the output of the first and second pumps can be adjusted to determine the ratio of the first and second chemicals;

a reaction tube comprising:

an inlet for receiving the first and second chemicals;

an outlet; and a check valve connected to the outlet; and wherein the first and second chemicals are mixed in the reaction tube and then discharged from the reaction tube outlet to mix with the fluid.

\* \* \* \* \*